March 29, 1960 F. LORD 2,930,588
MINING DRILL
Filed Nov. 6, 1956
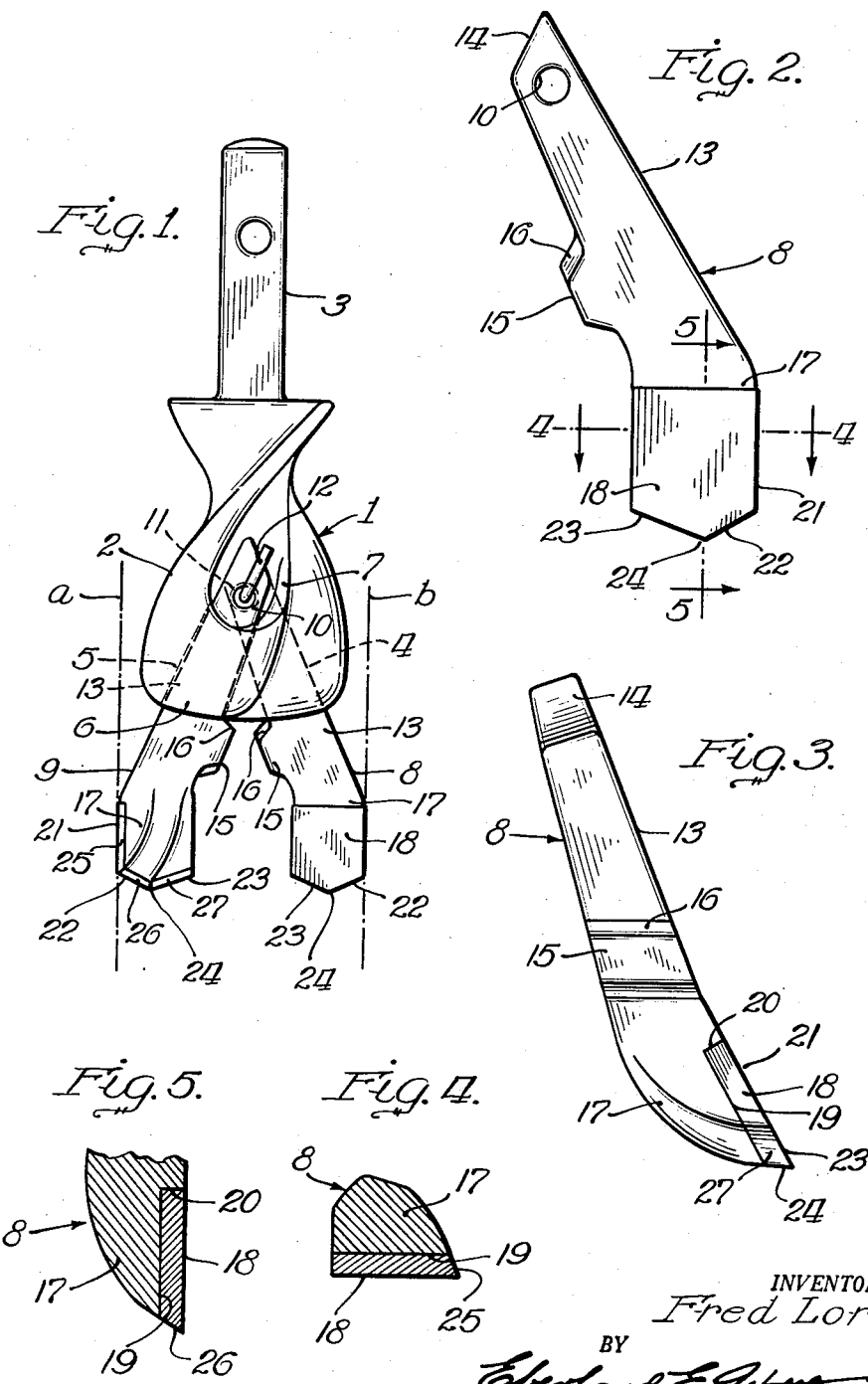
INVENTOR:
Fred Lord
BY
Eberhard E. Wettley
Atty.

United States Patent Office 2,930,588
Patented Mar. 29, 1960

2,930,588

MINING DRILL

Fred Lord, Joliet, Ill., assignor to McLaughlin Manufacturing Co., Inc., Joliet, Ill., a corporation of Illinois Application November 6, 1956, Serial No. 620,605

5 Claims. (Cl. 255—61)

This invention relates to a mining drill and to tools of analogous character employing cutting teeth that bore into hard materials.

More specifically, the invention is directed to a mining drill bit or tooth having certain advantageous attributes which all contribute to provide a low cost and efficient unit.

While many species of drills have been developed and some of these are being used in the field at the present time, economical design and standardization appear to be lacking. Universal use and applications of drills and bits are factors that are in need of improvement.

One of the objects of this invention is to provide mining drill heads with a number of sockets to receive removable and replaceable teeth or bits and wherein the latter are of an improved design to enhance the utility and application of the drills.

Another object of this invention is to provide composite teeth or bits for interchangeable use in one or more sizes and arrangements of auger bit heads, the teeth or bits being forgings with hardened cutting tips.

Many drills on the market provide forgings with integral teeth or bits to form U-shaped drill ends with an attached central shank for connection with drill rods or conveyor type augers. With drills of this kind, forging dies are needed for each size of drill and a large and costly inventory of such units must be maintained to supply the diversified needs of the field people.

Then also, if one tooth or bit on such drill becomes damaged or broken, the entire device must be discarded leading to a costly scapped piece of material.

It should further be impressed that grinding of the teeth or bits is a periodic necessity to provide an efficient drilling tool and one that will run smoothly and in a manner to minimize breakage. However, in drills where one piece forgings are employed the grinding of the teeth or bits requires handling of the whole unit with its obvious limitations in this sort of an operation that is carried out with at least two or more adjacent teeth or bits. This requires different handling and less efficient manipulation in providing the teeth with new cutting surfaces.

It is, therefore, another object of the present invention to provide unitary teeth or bits that can be socketed in a drill head and which can be readily removed for purposes of grinding to simplify that operation and to promote a greater amount of uniformity and control during the handling of such a unit.

Another object relates to the particular form and shape of the tooth or bit body to provide the means for backing up and well presenting the cutting instrumentality of such teeth or bits that is represented as a tungsten carbide member which is extremely hard but usually of a more brittle nature than the bodies of the teeth or bits.

Other objects and advantages relating to or inherently present in the mining drill of this invention shall hereinafter be explained or become apparent in the following detailed description of the drill with reference to a preferred embodiment thereof as shown in the drawing forming a part of this specification.

In the drawing:

Fig. 1 is a side elevational view of a mining drill embodying the new and novel features of this invention;

Fig. 2 is a side elevational view of one of the cutting teeth or bits as seen from the cutting face thereof;

Fig. 3 is an edge view of the tooth or bit as it appears when seen in a general plane taken at right angles with respect to the cutting face thereof;

Fig. 4 is a transverse cross sectional view of the cutting end of the tooth or bit as seen in the general plane of the line 4—4 in Fig. 2; and Fig. 5 is a vertical cross sectional view through the cutting end of the tooth or bit as taken substantially along the plane of the line 5—5 in Fig. 2.

With reference to the drawing, Fig. 1 shows a mining drill head with teeth or bits as a complete assembly and in the manner in which this device can be supplied for attachment with a drill rod or with a conveyor type of auger.

The head 1 provides a cast iron body 2 with a twisted outer surface contour and supplied with an attachment shank 3 and with tapered sockets 4 and 5 in the head end 6 that come through portions of the body in the opposite recesses 7 formed into the valleys in the twisted contour of the head body 2.

The head 1 may be made in a number of sizes and with two or more recesses or sockets such as 4 and 5 to accommodate two or more teeth and in such radial spaced positions as to provide various predetermined bore hole drill sizes.

In the present illustration, two teeth or bits 8 and 9 of identical design shape and contour are used to complete the mining drill structure. Since the teeth or bits are identical, one set of reference characters will apply to both such members.

Each of the teeth or bits are so made and proportioned to orient the retaining openings 10, when the teeth are socketed to the extent permitted by stop means formed thereon, for alignment with an opening 11 in the head to receive a locking wire 12. This wire is passed through all the aligned openings described and has its ends bent back into the valley portions of the head. Thus, a releasable retaining unit or detent means is provided to readily permit the removal of the individual teeth or bits for grinding, replacement or for any other purpose.

Each tooth or bit such as 8 or 9 is constructed as shown in Figs. 2 to 5. The tooth or bit is made with a straight sided tapered shank 13 having a canted end 14 for clearance purposes when assembled with the head, an intermediate tooth orientation stop 15 with a head engaging face or edge 16, and the tooth or bit is angled as shown in Fig. 2 to provide a contiguously formed backstop or base 17 to rigidly carry a cutting face tip 18 upon the cutting side of the tooth or bit 8.

Shank 13 tapers downwardly and outwardly as seen in Figs. 2 and 3 and then develops into the heavier rigid backstop or base 17 providing the cantilever end of the tooth that both positions the tip 18 and carries the tip under boring conditions and operation. The base 17 is ground at its outer end to provide a tip receiving wall 19 and a tip stop ledge 20 formed at right angles to wall 19, these portions of the tooth providing a tip receiving recess.

The tip 18 per se is a cutting element shaped out of a piece of tungsten carbide metal in the form of a plate of uniform thickness and with a polygonal outline of the contour best shown in Fig. 2. The tip comprises a radially outer cutting edge 21 to cut the bore wall and tapered leading or axially advanced terminal end cutting edges 22 and 23 meeting in a point 24. The tip is brazed into its recess in the tooth surface and then the entire unit is ground to establish receding or beveled surface portions 25, 26 and 27 on rear side or portion of the tip element 18 and blending these surfaces into the adjacent tooth base in continued receding fashion as best seen in Figs. 3, 4 and 5.

The angles of the sockets 4 and 5 in the head 1 are such as to guidedly accept the teeth 8 and 9 according to a predetermined clearance relationship between the shanks of each tooth and the walls of the head sockets, and the angular relation of the base of each tooth to its shank establishes the proper orientation of the cutting tip 18 and its cutting edges that are associated with that tooth or bit to place the radial outer cutting edge 21 of the tip 18 in a true vertical cutting relation that is substantially coincident with a hypothetical cylinder generated parallel to the axis of the mining drill assembly and concentrically therea bout. In this manner, the teeth 8 and 9 present relatively long cutting surfaces 21 in radially outward positions to produce a true cylindrical drill bore of a smooth predetermined and uniform diameter to clear the drill head and as defined by the spaced dot and dash lines a and b in Fig. 1.

The teeth shanks 13 are proportioned to fit with some clearance but as closely as practical into the sockets 4 and 5 of head 1 to prevent an excessive amount of play between the bits 8 and 9 and the head. The shoulder or stop 15 on each tooth, however, provides the orientation means between the teeth and the head to gauge and maintain the a to b drill hole size and the equal positions of the multiple teeth. Without a positive stop such as 15, the teeth can sink deeper into their respective sockets under operational pressures. When one tooth is more out of its true cutting position than the other tooth either axially, radially or both, that tooth carries the cutting load and its attendant unequal wear and tear.

With the relatively long and upright portions of the teeth tips, grinding may be resorted to for a greater portion of the lengths of the tips 18 and bases 17 to each provide a long service tooth that continues to hold its maximum bore diameter until its entire hardened composite end is substantially used up from continued grinding and use.

As stated hereinbefore, the same teeth are used in heads of different diameter sizes to drill bores of other diameters. Also, breaking of a tooth or bit, or of the loss or the cracking of a tip or bit does not render the entire mining drill obsolete or unserviceable. The tooth or bit is readily replaced and the assembly is again ready for service with a minimum of scrap.

This arrangement of a mining drill produces a very economical unit in its separable combination. The composite teeth or bits are relatively expensive so that the saving of at least one tooth in the event of breakage or damage of the companion tooth is a highly advantageous feature. The head also is retained for further use under these conditions.

Damage to the head merely requires transfer of the teeth or bits to another head. The versatility and efficient use of this boring tool is self evident.

Although the foregoing description has been directed to a preferred embodiment of the mining drill as portrayed in the drawing, certain changes in the general design of the elements thereof or in the combination of such elements are contemplated without departing from the fundamental concept of the invention. Such modifications and the extent thereof shall, however, be governed by the breadth and scope of the language contained in the appended claimed subject matter.

What I claim is:

1. A mining drill comprising, in combination, a unitary drill head having an axis providing downwardly and outwardly directed bit receiving sockets, drill bits interchangeable and loosely carried within said head sockets, and releasable locking means loosely interconnected with said bits and head to prevent accidental dropping out or loss of said drill bits from their respective sockets, said releasable bits each comprising a shank and a connected cutting tip thereon, said shank and tip occupying angular positions with respect to each other to orient the outer peripheral surface of said tip in a given extended position beyond the physical limits of the head when said shank is disposed within a head socket, and said tip being provided with surfaces having coacting cutting edges thereon, a first cutting edge positioned for radial cuttings axially outwardly of the head and at the outer terminal end of the bit to depth cut a bore of a given diameter in an axially advancing direction ahead of the drill head, a second cutting edge located rearwardly of the first cutting edge and being disposed along a radially outer side of said bit and parallel to the axis of said drill head to annularly cut a true cylindrical wall portion in the bore to finish cut said bore to a predetermined cylindrical diameter behind the advance cuttings of the outer terminal end of said bit tip under operative conditions.

2. A mining drill of the character defined in claim 1 wherein the head sockets and the shank portions of the bits are constructed with corresponding tapered faces for the orientation of said bits and for the ready release of the bits from the head sockets, and said bits each include raised stop means on an edge thereof for direct surface contact with an exterior physical part of the drill head adjacent the socket containing the bit to provide positive bit orientation means for the exact and repeated disposition of each of the bits respectively to reestablish the exact positions of the defined coacting cutting edges of the bits after each bit interchange, removal and replacement of such bits.

3. A mining drill comprising, in combination, a drill head having an axis and having downwardly and outwardly directed bit receiving sockets, drill bits for said sockets, and retaining means to releasably and lossely retain such bits within their respective head sockets, said bits each comprising a shank to enter a head socket and a connected cutting base thereon, said base having cutting surfaces on the axially outer terminal end thereof and a cutting surface on a radially outer side thereof having a cutting edge extending parallel to the axis of said drill head and in an extended position beyond the physical limits of said drill head, said shank providing loose orientation means within a head socket to dispose said cutting surfaces on said bit base in predetermined axial and radial positions with respect to the turning axis of said drill head, and a positive stop member on the shank to bodily engage a physical outer surface part of said head adjacent a bit socket to limit any possible additional relative inward movement of the drill bit into the head socket to thereby fix the positions of the cutting surfaces on the bit relative to the drill head under all operative conditions.

4. A mining drill of the character defined in claim 3 wherein said positive stop member is located on a side of the bit disposed radially inwardly with respect to the head to describe a relatively small circle within a drilled bore and to occupy a position radially inwardly and axially displaced upwardly with respect to said annular and terminal end cutting surfaces of the bit.

5. A mining drill of the character defined in claim 3 wherein said head sockets are tapered convergingly inwardly, said bit shanks are each provided with tapered walls to correspond with the tapered head sockets, and said positive stop occupies a predetermined position spaced downwardly from the socket end of the shank to abut an outer surface area on said drill head whereby to orient said shank in a position for free withdrawal and release from its head socket upon release of said retaining means.

References Cited in the file of this patent

UNITED STATES PATENTS

| | | |
|---|---|---|
| 814,856 | Lonski | Mar. 13, 1906 |
| 2,114,799 | McGlaughlin | Apr. 19, 1938 |
| 2,648,525 | Phipps | Aug. 11, 1953 |
| 2,650,071 | Rassieur | Aug. 25, 1953 |
| 2,756,025 | Lay | July 24, 1956 |